United States Patent
Chen et al.

(10) Patent No.: US 11,159,788 B2
(45) Date of Patent: Oct. 26, 2021

(54) METHOD AND APPARATUS OF ENHANCED INTRA BLOCK COPYING MODE FOR VIDEO CODING

(71) Applicant: MEDIATEK INC., Hsinchu (TW)

(72) Inventors: Chun-Chia Chen, Hsinchu (TW);
Yu-Ling Hsiao, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/257,929

(22) PCT Filed: Aug. 2, 2019

(86) PCT No.: PCT/CN2019/099005
§ 371 (c)(1),
(2) Date: Jan. 5, 2021

(87) PCT Pub. No.: WO2020/025041
PCT Pub. Date: Feb. 6, 2020

(65) Prior Publication Data
US 2021/0250580 A1 Aug. 12, 2021

Related U.S. Application Data

(60) Provisional application No. 62/842,639, filed on May 3, 2019, provisional application No. 62/714,146, filed on Aug. 3, 2018.

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/137* (2014.11); *H04N 19/159* (2014.11); *H04N 19/176* (2014.11); *H04N 19/70* (2014.11)

(58) Field of Classification Search
CPC .. H04N 19/105; H04N 19/137; H04N 19/159; H04N 19/176; H04N 19/70
See application file for complete search history.

(56) References Cited

U.S. PATENT DOCUMENTS

| | | | |
|---|---|---|---|
| 9,955,185 B2 | 4/2018 | Wu et al. | |
| 10,356,438 B2 | 7/2019 | Chuang et al. | |

(Continued)

FOREIGN PATENT DOCUMENTS

| | | | |
|---|---|---|---|
| CN | 105898330 A | 8/2016 | |
| CN | 106797464 A | 5/2017 | |

(Continued)

OTHER PUBLICATIONS

International Search Report dated Nov. 8, 2019, issued in application No. PCT/CN2019/099005.

(Continued)

*Primary Examiner* — Zhihan Zhou
(74) *Attorney, Agent, or Firm* — McClure, Qualey & Rodack, LLP

(57) ABSTRACT

A method and apparatus Inter prediction for video coding including IBC (Intra Block Copy) coding tool are disclosed. According to one method, a current permitted band inside the current picture for the current block is identified. A target IBC candidate is selected, where a target block vector of the target IBC candidate points from the current block to a target reference block in the current picture. An adjusted candidate list is generated by taking into account of the target IBC candidate and the current permitted band. The current motion information associated with the current block is encoded using the adjusted candidate list at the video encoder side or decoded using the adjusted candidate list at the video decoder side using the adjusted candidate list. In another method, a syntax for a target MVD (Motion Vector (Continued)

Difference) is decoded without sign information or with reduced sign information of the target MVD.

11 Claims, 13 Drawing Sheets

(51) Int. Cl.
*H04N 19/159* (2014.01)
*H04N 19/176* (2014.01)
*H04N 19/70* (2014.01)
*H04N 19/137* (2014.01)

(56) References Cited

U.S. PATENT DOCUMENTS

| | | |
|---|---|---|
| 10,560,693 B2 | 2/2020 | Won et al. |
| 10,587,881 B2 | 3/2020 | Xu et al. |
| 2016/0241875 A1* | 8/2016 | Wu .................. H04N 19/423 |
| 2018/0152727 A1* | 5/2018 | Chuang .................. H04N 19/70 |
| 2018/0160122 A1* | 6/2018 | Xu .................. H04N 19/433 |
| 2018/0302645 A1* | 10/2018 | Laroche .............. H04N 19/156 |
| 2020/0260102 A1 | 8/2020 | Lin et al. |

FOREIGN PATENT DOCUMENTS

| | | | |
|---|---|---|---|
| CN | 107615762 A | 1/2018 | |
| CN | 107852505 A | 3/2018 | |
| CN | 108293131 A | 7/2018 | |
| WO | WO-2016192677 A1 * | 12/2016 | ............ H04N 19/70 |
| WO | 2017/090961 A1 | 6/2017 | |
| WO | 2018/074813 A1 | 4/2018 | |

OTHER PUBLICATIONS

Chinese language office action dated Nov. 10, 2020, issued in application No. TW 108127698.

* cited by examiner

840

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | | |
| 4 | | |

850

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | (0,0),ref0 | (0,0),ref0 |
| 4 | (0,0), ref1 | (0,0), ref1 |

| amvp_idx | L0 |
|---|---|
| 0 | mvL0_A |
| 1 | mvL0_B |
| 2 | |

862

| amvp_idx | L1 |
|---|---|
| 0 | mvL1_A |
| 1 | |
| 2 | |

870

| amvp_idx | L0 |
|---|---|
| 0 | mvL0_A |
| 1 | mvL0_B |
| 2 | (0,0) |

872

| amvp_idx | L1 |
|---|---|
| 0 | mvL1_A |
| 1 | (0,0) |
| 2 | |

METHOD AND APPARATUS OF ENHANCED INTRA BLOCK COPYING MODE FOR VIDEO CODING

CROSS REFERENCE TO RELATED APPLICATIONS

The present invention claims priority to U.S. Provisional Patent Application, Ser. No. 62/714,146, filed on Aug. 3, 2018 and U.S. Provisional Patent Application, Ser. No. 62/842,639 filed on May 3, 2019. The U.S. Provisional Patent Applications are hereby incorporated by reference in their entireties.

FIELD OF THE INVENTION

The present invention relates to Intra Block Copy (IBC) prediction for video coding. In particular, the present invention discloses techniques to improve hardware processing efficiency by imposing guard band or permitted band restriction. Furthermore, techniques to reduce bit rate associated with MVD (Motion Vector Difference) are disclosed, where the sign information of MVD is decoded utilizing guard band or permitted band information without the sign information of MVD or with reduced sign information of the MVD.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

QTBT Structure

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a CTU (or CTB for I slice) is the root node of a quadtree and the CTU is firstly partitioned by a quadtree, where the quadtree splitting of one node can be iterated until the node reaches the minimum allowed quadtree leaf node size (i.e., MinQTSize). If the quadtree leaf node size is not larger than the maximum allowed binary tree root node size (i.e., MaxBTSize), it can be further partitioned by a binary tree. The binary tree splitting of one node can be iterated until the node reaches the minimum allowed binary tree leaf node size (i.e., MinBTSize) or the maximum allowed binary tree depth (i.e., MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 6 shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 6, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates.

The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 7 illustrates an example of the derivation process for combined bi-predictive Merge candidate. The candidate set 710 corresponds to an original candidate list, which includes mvL0_A, ref0 (731) in L0 and mvL1_B, ref (732) in L1. A bi-prediction MVP 733 can be formed by combining the candidates in L0 and L1 as indicated by the process 730 in FIG. 7.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 8A, where candidate list 810 corresponds to an original candidate list and candidate list 820 corresponds to the expanded candidate list including two generated bi-prediction MVPs as illustrated by process 830.

In candidate type 3, Zero vector Merge/AMVP candidates are created by combining zero vectors and reference index, which can be referred. FIG. 8B illustrates an example for adding zero vector Merge candidates, where candidate list 840 corresponds to an original Merge candidate list and candidate list 850 corresponds to the extended Merge candidate list by adding zero candidates. FIG. 8C illustrates an example for adding zero vector AMVP candidates, where candidate lists 860 (L0) and 862 (L1) correspond to original AMVP candidate lists and the candidate list 870 (L0) and 872 (L1) correspond to the extended AMVP candidate lists by adding zero candidates. If zero vector candidates are not duplicated, it is added to Merge/AMVP candidates list.

IBC Mode

Current picture referencing (CPR) or Intra block copy (IBC) has been proposed during the standardization of HEVC SCC extensions. It has been proved to be efficient for coding screen content video materials. The IBC operation is very similar to original Inter mode in video codec. However, the reference picture is the current decoded frame instead of previously coded frames. Some details of IBC can be found in JVET-K076 (X. Xu, et al., "CE8-2.2: *Current picture referencing using reference index signaling*", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0076) and a technical paper by Xu, et al. (X. Xu, et al., "*Intra Block Copy in HEVC Screen Content Coding Extensions*," IEEE J. Emerg. Sel. Topics Circuits Syst., vol. 6, no. 4, pp. 409-419, 2016).

The IBC coding mode requires reference samples from the current picture. In particular, the IBC coding of a current block often requires reference samples immediately above or to the left of the current block. Therefore, the IBC process of the current block has to wait until the neighbouring sample are fully processed and reconstructed, which imposes very tight constraints on hardware design. In order to make the IBC more hardware design friendly, it is desirable to develop techniques to overcome the issue.

BRIEF SUMMARY OF THE INVENTION

A method and apparatus Inter prediction for video coding including IBC (Intra Block Copy) coding tool are disclosed. According to one method of the present invention, input data related to a current block in a current picture are received at a video encoder side or a video bitstream corresponding to compressed data including the current block in the current picture is received at a video decoder side. A current permitted band inside the current picture for the current block is identified. A target IBC candidate is selected, where a target block vector of the target IBC candidate points from the current block to a target reference block in the current picture. An adjusted candidate list is generated by taking into account of the target IBC candidate and the current permitted band. The current motion information associated with the current block is encoded using the adjusted candidate list at the video encoder side or decoded using the adjusted candidate list at the video decoder side using the adjusted candidate list.

In one embodiment, the target IBC candidate is removed from the adjusted candidate list if the target reference block is not fully inside the current permitted band.

In one embodiment, the target IBC candidate corresponds to a default candidate. If the target reference block is not fully inside the current permitted band, the target IBC candidate is adjusted to cause the target reference block to be fully inside the current permitted band. The target IBC candidate can be adjusted by adding a first offset to an x-component of the target IBC candidate, adding a second offset to a y-component of the target IBC candidate, or adding the first offset and the second offset to the x-component of the target IBC candidate and the y-component of the target IBC candidate respectively.

In one embodiment, position ordering of the target IBC candidate within the adjusted candidate list is determined based on the target IBC candidate and the current permitted band. For example, the position ordering of the target IBC candidate within the adjusted candidate list can be determined depending on whether the target reference block is fully inside the current permitted band. In another example, the target IBC candidate is placed in the adjusted candidate list such that a target position of the target IBC candidate in the adjusted candidate list toward a rear part of the adjusted candidate list if the target reference block is outside the current permitted band. In yet another example, the target IBC candidate is placed in the adjusted candidate list such that a target position of the target IBC candidate in the adjusted candidate list toward a front part of the adjusted candidate list if the target reference block is inside the current permitted band.

In one embodiment, position ordering of the target IBC candidate within the adjusted candidate list is further determined based on L-shape template matching cost.

The adjusted candidate list may correspond to a Merge candidate list or an AMVP (Advanced Motion Vector Prediction) candidate list.

In another method, a current permitted band inside the current picture is identified for the current block. A syntax for a target MVD (Motion Vector Difference) is signalled at an encoder side or parsed at an encoder side without sign information of the target MVD or with reduced sign information of the target MVD by utilizing side information including the current permitted band, where the target MVD corresponds to a difference between a current motion vector of the current block and a target IBC candidate. The current motion information associated with the current block is encoded at the encoder or decoded at the decoder side using an AMVP (Advanced Motion Vector Prediction) candidate list, where the AMVP candidate list comprises the target IBC candidate.

In one embodiment, correct signs associated with the target MVD are decoded among possible sign combinations of the target MVD at the decoder side based on the current permitted band at the decoder side without the sign information of the target MVD or with the reduced sign information of the target MVD. For example, the correct signs causes a reference block pointed by the target IBC candidate to be inside the current permitted band. In another example, a target combination of the target MVD is excluded from a candidate for the correct signs associated with the target MVD if the target combination of the target MVD causes a reference block associated with the target combination of the target MVD to be outside the current permitted band.

BRIEF DESCRIPTION OF THE DRAWINGS

FIG. 8B illustrates an example of adding zero vector Merge candidates, where the candidate list on the left corresponds to an original Merge candidate list and the candidate list on the right corresponds to the extended Merge candidate list by adding zero candidates.

FIG. 8C illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.

FIG. 11C to FIG. 11F illustrate examples of permitted band for a current CU according to embodiments of the present invention.

DETAILED DESCRIPTION OF THE INVENTION

Figure 1:
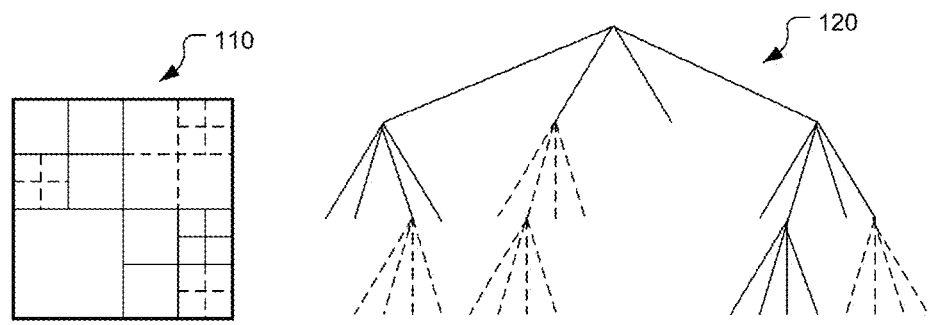
FIG. 1 illustrates an example of block partition using quadtree structure to partition a coding tree unit (CTU) into coding units (CUs).
Figure 2:
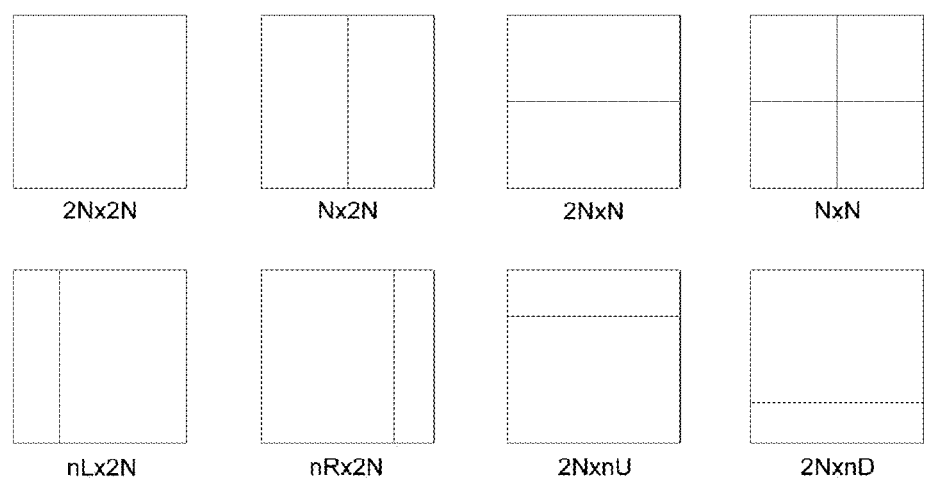
FIG. 2 illustrates asymmetric motion partition (AMP) according to High Efficiency Video Coding (HEVC), where the AMP defines eight shapes for splitting a CU into PU.
Figure 3:
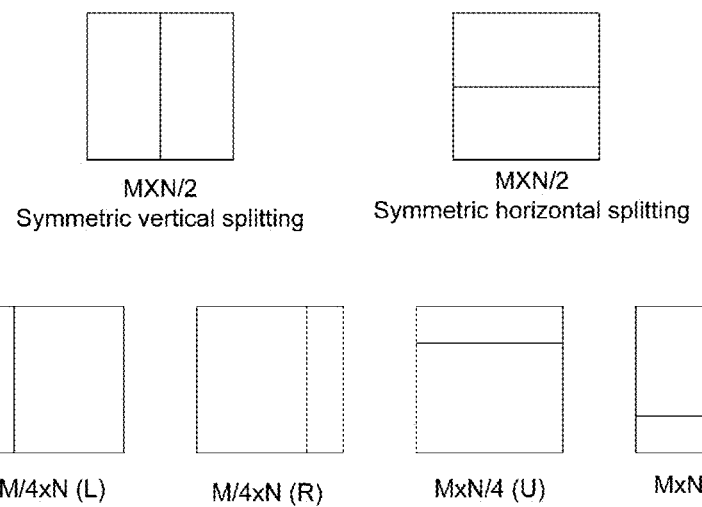
FIG. 3 illustrates an example of various binary splitting types used by a binary tree partitioning structure, where a block can be recursively split into two smaller blocks using the splitting types.
Figure 4:
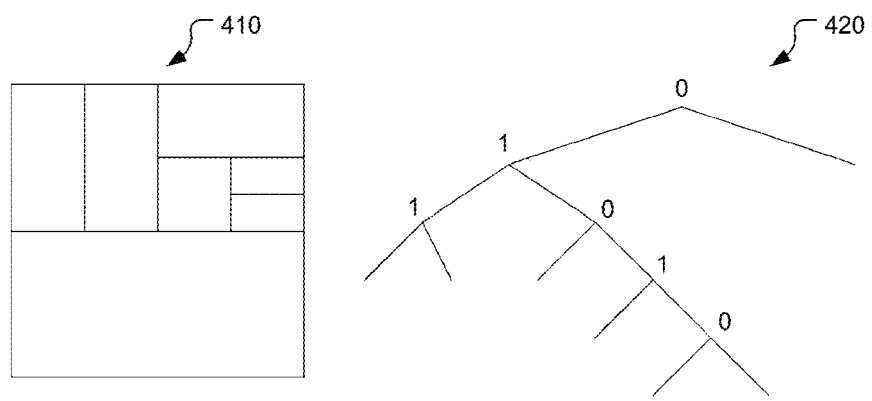
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 5:
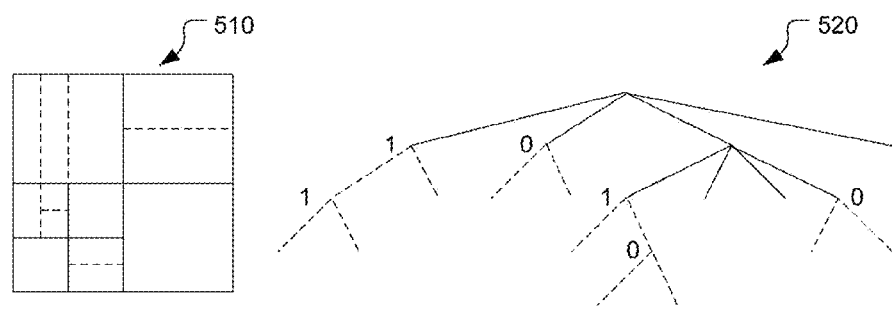
FIG. 5 illustrates an example of block partitioning and its corresponding QTBT, where the solid lines indicate quadtree splitting and dotted lines indicate binary tree splitting.
Figure 6:
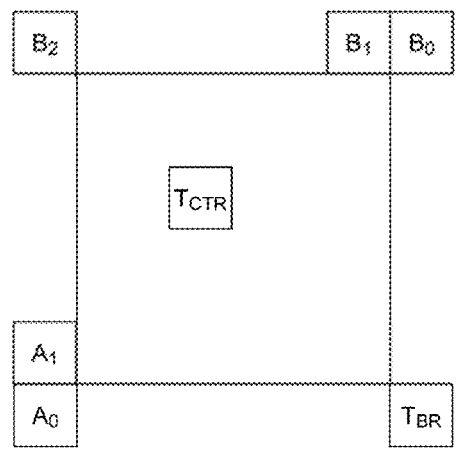
FIG. 6 shows the neighbouring PUs used to derive the spatial and temporal MVPs for both AMVP and Merge scheme.
Figure 7:
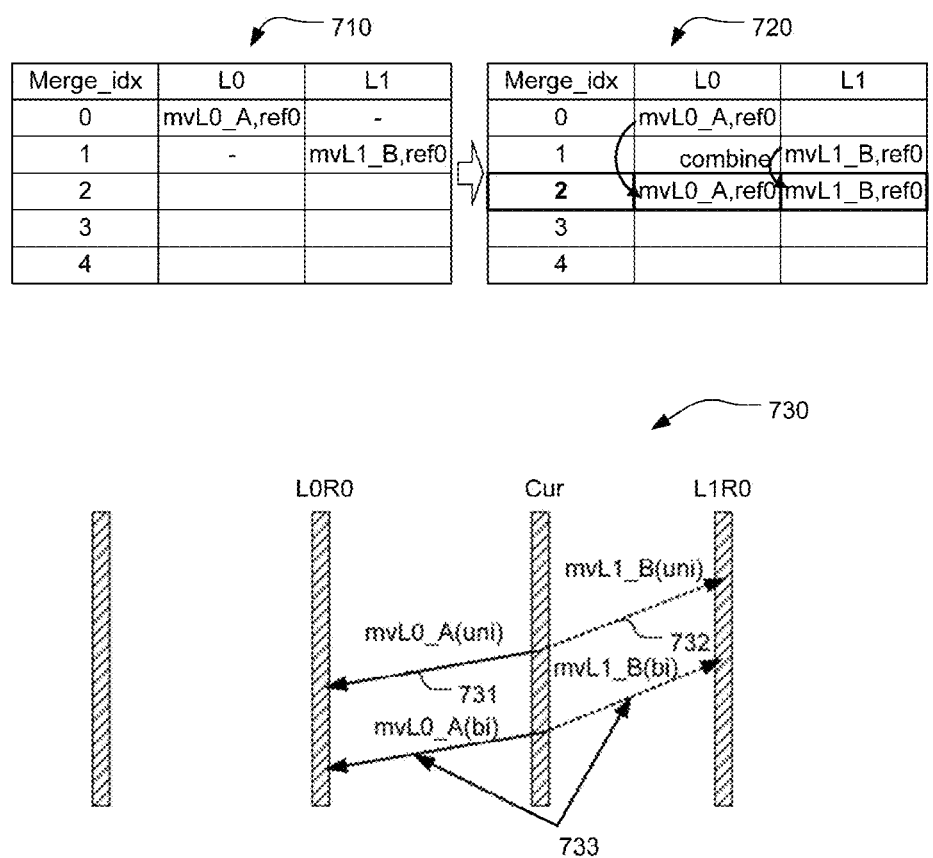
FIG. 7 illustrates an example of the derivation process for combined bi-predictive Merge candidate.
Figure 8A:
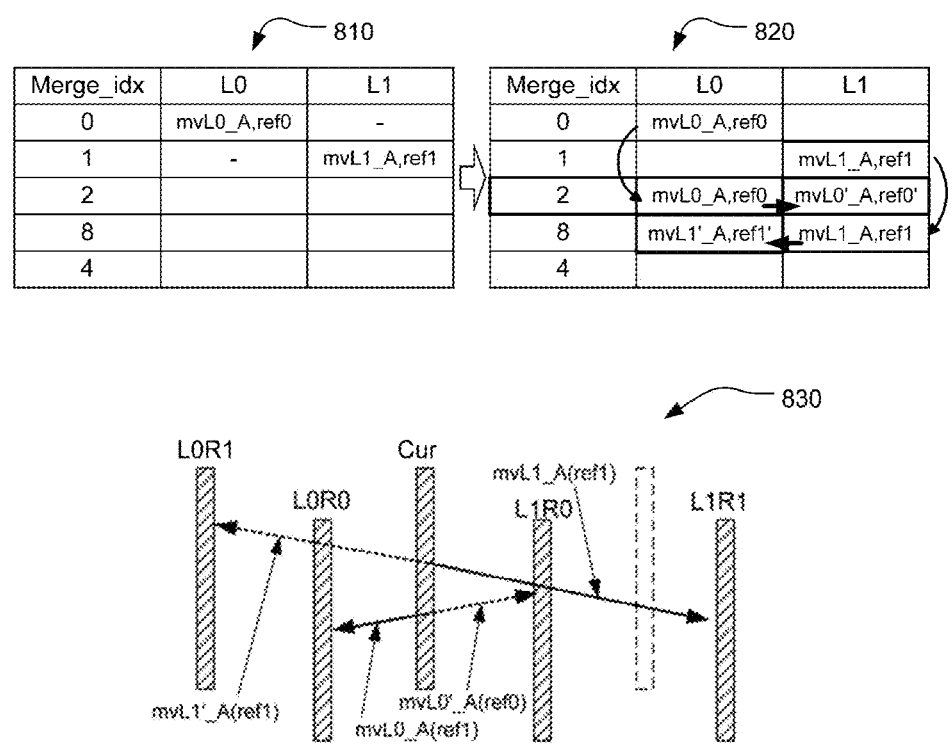
FIG. 8A illustrates an example of the derivation process of the scaled bi-predictive Merge candidate, where candidate list on the left corresponds to an original candidate list and the candidate list on the right corresponds to the expanded candidate list including two generated bi-prediction MVPs.

The following description is of the best-contemplated mode of carrying out the invention. This description is made for the purpose of illustrating the general principles of the invention and should not be taken in a limiting sense. The scope of the invention is best determined by reference to the appended claims.

While the Intra Block Coding (IBC) method has been shown to improve the coding performance, there exists processing dependence between a current block and its neighbouring reconstructed samples, which may slow down overall system performance. Accordingly, it is desired to develop methods that can alleviate the dependence issue and ease hardware design.

VVC-Style IBC Mode (CPR Mode)

Intra block copy mode has been included in the emerging video coding standard called VVC (Versatile Video Coding) as a coding tool. The VVC-style IBC mode is briefly reviewed as follows.

VVC Style—Intra Block Copy (IBC)

Intra block copy (IBC) is a coding tool adopted in HEVC extensions on SCC (screen content coding). It is well known that it significantly improves the coding efficiency of screen content materials. Since IBC mode is implemented as a block-level coding mode, block matching (BM) is performed at the encoder to find the optimal block vector (or motion vector) for each CU. A motion vector is used to indicate the displacement from the current block to a reference block, which is already reconstructed inside the current picture. The luma motion vector of an IBC-coded CU is always in integer precision according to the existing practice. The chroma motion vector is clipped to integer precision as well. When combined with AMVR (Adaptive Motion Vector Resolution), the IBC mode can switch between 1-pel and 4-pel motion vector precisions. An IBC-coded CU is treated as the third prediction mode other than Intra or Inter prediction modes.

To reduce memory consumption and decoder complexity, the IBC in VTM4 (J. Chen, et al., "Algorithm Description for Versatile Video Coding and Test Model 4 (VTM 4)", Joint Video Experts Team (JVET) of ITU-T SG 16 WP 3 and ISO/IEC JTC 1/SC 29/WG 11, 13th Meeting: Marrakech, Mass., 9-18 Jan. 2019, Document: JVET-M1002) allows only the reconstructed portion of the predefined area including current CTU to be used. This restriction allows the IBC mode to be implemented using local on-chip memory for hardware implementations.

At the encoder side, hash-based motion estimation is performed for IBC. The encoder performs RD (Rate-Distortion) check for blocks with either width or height no larger than 16 luma samples. For non-Merge mode, the block vector search is performed using hash-based search first. If hash search does not return a valid candidate, block matching based local search will be performed.

In the hash-based search, hash key matching (e.g. 32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to be N samples to the left and on top of the current block within the current CTU. At the beginning of a CTU, the value of N is initialized to 128 if there is no temporal reference picture; and initialized to 64 if there is at least one temporal reference picture. A hash hit ratio is defined as the percentage of samples in the CTU that found a match using hash-based search. While encoding the current CTU, if the hash hit ratio is below 5%, N is reduced by half.

At CU level, IBC mode is signalled with a flag and it can be signaled as IBC AMVP mode or IBC Skip/Merge mode as follows:

IBC Skip/Merge mode: a Merge candidate index is used to indicate which of the block vectors in the list from neighbouring candidate IBC coded blocks is used to predict the current block. The Merge list consists of spatial, HMVP (history-based MVP), and pairwise candidates.

IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

VVC Style—IBC Interaction with Other Coding Tools

IBC mode was adopted into VTM3 (J. Chen, et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, 12th Meeting: Macao, Conn., 3-12 Oct. 2018, Document: JVET-L1002). However, the Interaction between IBC mode and newly adopted coding tools, such as pairwise Merge candidate, history based motion predictor, Intra/Inter multi-hypothesis mode (CIIP), Merge Mode With Motion Vector Difference (MMVD), and triangular partition are defined in VTM4 more clearly.

First, IBC can be used with pairwise Merge candidate and history based motion predictor. A new pairwise IBC Merge candidate can be generated by averaging two IBC Merge candidates. For history-based motion predictor, IBC motion is inserted into history buffer for future referencing.

Second, IBC cannot be used with other Inter tools, such as affine motion, CIP, MMVD, and triangular partition.

The current picture is no longer included as one of the reference pictures in the reference picture list 0. The derivation process of motion vectors for IBC mode excludes all neighbouring blocks in Inter mode and vice versa. The followings are summary of Interaction between IBC and other coding tools.

- Share the same process as in regular MV Merge including with pairwise Merge candidate and history based motion predictor, but disallow TMVP and zero vector because they are invalid for IBC mode.
- Separate HMVP buffer, with 5 candidates each, is used for conventional MV and IBC.
- Constraints to be implemented in bitstream, no invalid vectors, Merge shall not be used if the Merge candidate is invalid (i.e., out of range or 0).
- For deblocking, IBC is handled as Inter mode.
- CIIP does not use IBC.
- AMVR does not use quarter-pel, where AMVR is signalled to indicate whether MV is integer-pel or 4 integer-pel).

The Permitted Band Constraint of VVC Style IBC Mode

In VVC-style IBC mode, the reference sample for the current picture has an important band constraint as shown in the JVET-N0173 (H. Gao, et al., "Non-CE8: IBC Reference Area Rearrange", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0173).

Figure 9A:
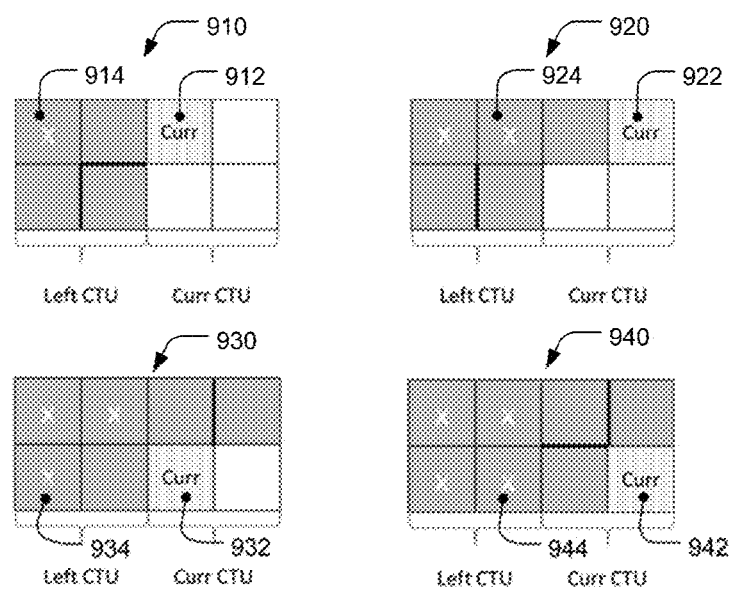
FIG. 9A illustrates an example of IBC reference areas when QT (Quadtree) or HBT (Horizontal Binary Tree) is used for the current CTU level.
Figure 9B:
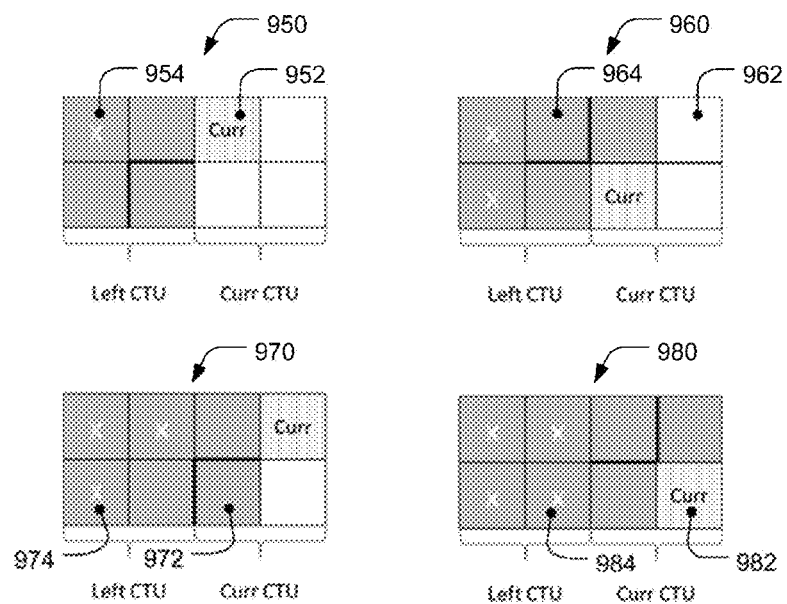
FIG. 9B illustrates an example of IBC reference areas when QT (Quadtree) or VBT (Vertical Binary Tree) is used for the current CTU level.

VVC Draft 4.0 uses both the samples in the current CTU and left CTU to predict the IBC mode. In the current CTU, all reconstructed samples can be used as reference of the current IBC block. In the left CTU of the current CTU, the CTU is divided into 4 64×64 areas. If the collocated 64×64 area in the current CTU is not yet reconstructed, the 64×64 area in the left CTU is considered as reference of the current IBC block. FIG. 9A shows the CTU level using QT split or horizontal BT split case. During processing step 910, the current 64×64 area (912) in the current CTU is not yet processed. Therefore, the collocated 64×64 area (914) in the left CTU is used as reference of the current IBC block (912). During processing step 920, the collocated 64×64 area (924) in the left CTU is used as reference of the current IBC block (922). During processing step 930, the collocated 64×64 area (934) in the left CTU is used as reference of the current IBC block (932). During processing step 940, the collocated 64×64 area (944) in the left CTU is used as reference of the current IBC block (942). FIG. 9B shows the CTU level using vertical BT split case. During processing step 950, the current 64×64 area (952) in the current CTU is not yet processed. Therefore, the collocated 64×64 area (954) in the left CTU is used as reference of the current IBC block (952). During processing step 960, the collocated 64×64 area (964) in the left CTU is used as reference of the current IBC block (962). During processing step 970, the collocated 64×64 area (974) in the left CTU is used as reference of the current IBC block (972). During processing step 980, the collocated 64×64 area (984) in the left CTU is used as reference of the current IBC block (982).

In VVC-style IBC mode, the reference sample for the current picture has an important band constraint as shown in the previous description. However, the VVC-style IBC may change the permitted band definition in the future. Therefore, in the present invention, a general permitted band is defined as 2 parts:

- one part is the reconstructed samples of the current CTU, and
- the other part is some reconstructed sample of previous CTU.

Shared Candidate List

According to this technique, all leaf CUs of one ancestor node in the CU split tree share the same merging candidate list for enabling parallel processing of small Skip/Merge-coded CUs. The ancestor node is named the Merge sharing node. The shared merging candidate list is generated at the Merge sharing node pretending the Merge sharing node is a leaf CU.

Figure 10A:
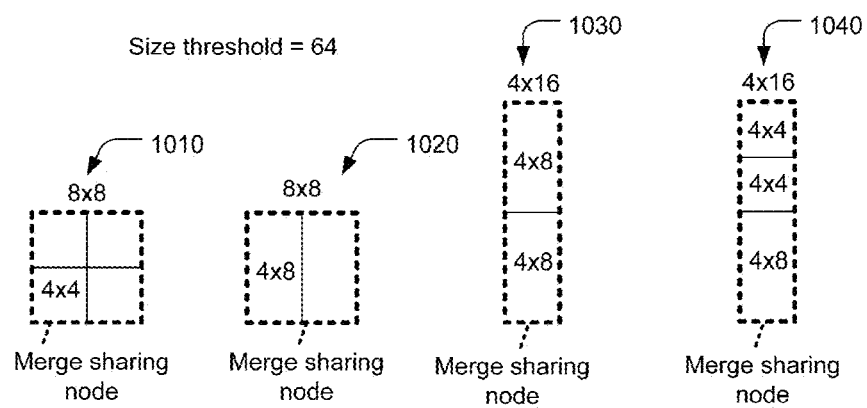
FIG. 10A illustrates examples of all leaf CUs of one ancestor node (named Merge sharing node) in the SCU split tree to share a same candidate list.

FIG. 10A shows four examples of Merge sharing nodes. The shared merging candidate list is generated for the dotted virtual CU (i.e., Merge sharing node). In partition 1010, the Merge sharing node corresponding to an 8×8 block is split into 4 4×4 blocks. In partition 1020, the Merge sharing node corresponding to an 8×8 block is split into 2 4×8 blocks. In partition 1030, the Merge sharing node corresponding to a 4×16 block is split into 2 4×8 blocks. In partition 1040, the Merge sharing node corresponding to a 4×16 block is split into 2 4×4 blocks and 1 8×8 block.

Figure 10B:
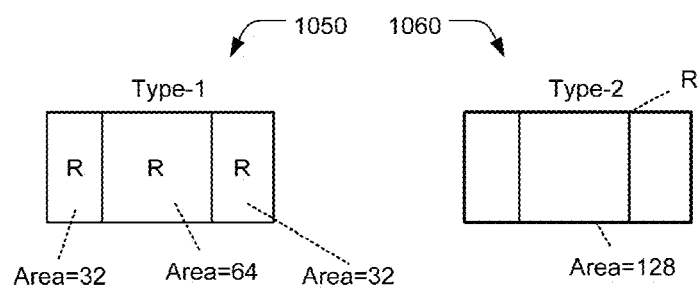
FIG. 10B illustrates examples of Type-1 and Type-2 shared Merge candidate lists, where the ternary-split is used to split a CU into three child CUs.

According to the shared candidate list technique, there are 2 types of size threshold definitions denoted as Type-1 (1050) and Type-2 (1060) as shown in FIG. 10B. For Type-1 definition, the Merge sharing node will be decided for each CU inside a CTU during parsing stage of decoding. Moreover, the Merge sharing node is the largest ancestor node among all the ancestor nodes of the leaf CUs satisfying the following two criteria:

(1) The Merge sharing node size is equal to or smaller than the size threshold, and (2) No samples of the Merge sharing node are outside the picture boundary.

Therefore, in cases that the Merge sharing mode is fully inside the current picture, the parent node of the Merge sharing node is larger than the predefined size threshold.

For Type-2 definition, the Merge sharing node will be decided for each CU inside a CTU during parsing stage of decoding. Moreover, the Merge sharing node is an ancestor node of leaf CU which must satisfy the following 2 criteria:

(1) The Merge sharing node size is equal to or larger than the size threshold (2) In the Merge sharing node, one of the child CU size is smaller than the size threshold Moreover, no samples of the Merge sharing node are outside the picture boundary has to be guaranteed. During parsing stage, if an ancestor node satisfies the criteria (1) and (2), but has some samples outside the picture boundary, this ancestor node will not be the Merge sharing node and it proceeds to find the Merge sharing node for its child CUs.

FIG. 10B illustrates examples, where the parent node is ternary-split into 3 child CUs. The size of parent node is 128. For Type-1 definition, the 3 child-CUs will be Merge sharing nodes separately. However, for Type-2 definition, the parent node is the Merge sharing node.

The shared merging candidate list method supports translational Merge (i.e., including Merge mode, triangle Merge mode, history-based candidate) and subblock-based Merge mode. For all kinds of Merge mode, the behavior of shared merging candidate list algorithm looks basically the same, and it just generates candidates at the Merge sharing node pretending the Merge sharing node is a leaf CU. It has 2 major benefits. The first benefit is to enable parallel processing for Merge mode, and the second benefit is to share all computations of all leaf CUs into the Merge sharing node. Therefore, it significantly reduces the hardware cost of all Merge modes for hardware codec. According to the shared merging candidate list algorithm, the encoder and decoder can easily support parallel encoding for Merge mode. The shared merging candidate list algorithm relieves the cycle budget problem of Merge mode.

Moreover, shared candidate list can apply to Merge mode and/or AMVP mode and/or IBC Merge mode and/or IBC AMVP mode.

Adaptive Motion Vector Resolution (AMVR)

In HEVC, motion vector differences (MVDs) (between the motion vector and predicted motion vector of a CU) are signalled in units of quarter-luma-sample when use_integer_mvflag is equal to 0 in the slice header. In VVC, a CU-level adaptive motion vector resolution (AMVR) scheme is introduced. AMVR allows MVD of the CU to be coded in units of quarter-luma-sample, integer-luma-sample or four-luma-sample. The CU-level MVD resolution indication is conditionally signalled if the current CU has at least one non-zero MVD component. If all MVD components (i.e., both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate whether integer-luma-sample or four-luma-sample MVD precision is used. In order to ensure the reconstructed MV has the intended precision (quarter-luma-sample, Integer-luma-sample or four-luma-sample), the motion vector predictors for the CU will be rounded to the same precision as that of the MVD before being added together with the MVD. The motion vector predictors are rounded toward zero (i.e., a negative motion vector predictor to be rounded toward positive infinity and a positive motion vector predictor to be rounded toward negative infinity). The encoder determines the motion vector resolution for the current CU using RD check. In VTM4, the RD check of four-luma-sample MVD resolution is only invoked conditionally to avoid always performing CU-level RD check three times for each MVD resolution. The RD cost of quarter-luma-sample MVD precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is Skipped.

Method 1—Guard Band in IBC Mode

To make the IBC more hardware design friendly, the guard band method is proposed according to one embodiment of the present invention. When the IBC mode is coded, it can have a guard band. The guard band is a region in the current picture that the motion vector of IBC cannot point to. In other words, the required pixels of the reference block, including some extra pixels for Interpolation filter, for the reference block pointed by the motion vector of IBC cannot include pixels in the guard band. Another term, "permitted band" can be defined as the inverse of guard band.

The "permitted band" is the region of pixels in the current picture and not belonging to the guard band. The "permitted band" can also be defined as: "the required reference block pixels (including some extra pixels for Interpolation filter) for reference block pointed by the motion vector of IBC that must be all inside the permitted band. The terms "guard band" and "permitted band" with proper conditions may be used interchangeably in this disclosure. For example, the phrase "reference samples outside a guard band of the current block" is equivalent to the phrase " " samples inside a permitted band of the current block.

There are several types of guard band or permitted band including near-current-CU guard band and far-current-CU guard band (also named near-current-CU permitted band).

Near-Current-CU Guard Band

Figure 11A:
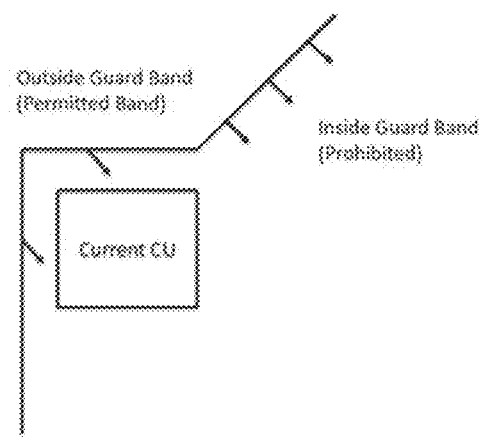
FIG. 11A and FIG. 11B illustrate examples of guard band or permitted band according to embodiments of the present invention, where the region pixels marked "inside guard band" are the region of guard band, and the region not belonging the guard band is the "permitted band.
Figure 11B:
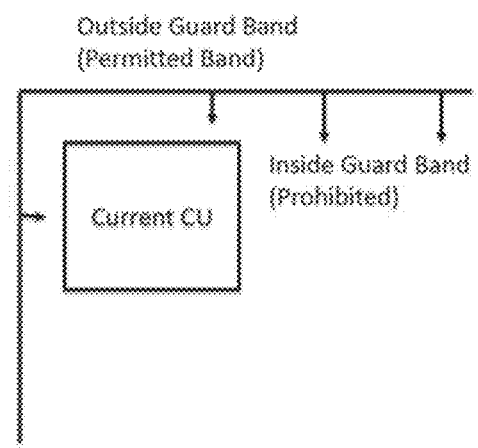

In the near-current-CU guard band, the region pixels near the current CU are prohibited from being used as reference pixels. Some examples of near-current-CU guard band are shown in FIG. 11A and FIG. 11B, where the region pixels marked "inside guard band" are the region of guard band, and the region not belonging the guard band is the "permitted band". The "permitted band" is the permitted region for the required block pixels, including some extra pixels for interpolation filter, for the reference block pointed by the motion vector of IBC. The "permitted band" corresponds to a region that MV of IBC mode can point to.

Note that, FIG. 11A and FIG. 11B are only examples of the near-current-CU guard band.

The present invention is not limited to these examples. The proposed "near-current-CU guard band" may be any pixels region that is closer to the current CU.

Far-Current-CU Guard Band (or Near-Current-CU Permitted Band)

Figure 11C:
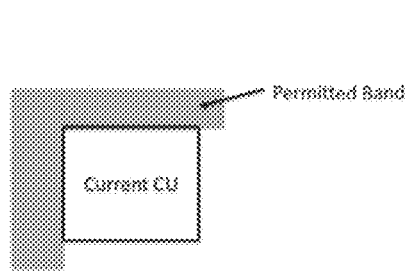
Figure 11D:
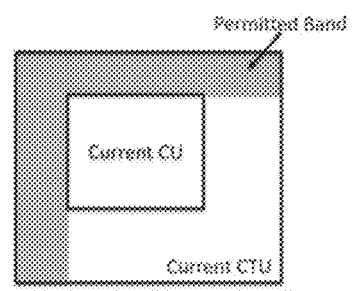

In the proposed far-current-CU guard band, the region pixels far away from the current CU are prohibit for reference pixels. Some examples of far-current-CU guard band are shown as follows. In FIG. 11C, some pixel lines (a grey rectangular area) above the current CU and some pixel columns (a grey rectangular area) on the left of the current CU are marked as the permitted band. Any pixel not belonging to permitted band is categorized as the far-current-CU guard band. In FIG. 11D, the pixels above the current CU (but inside the current CTU) are marked as permitted band, and the left neighbouring pixels of the current CU (but inside the current CTU) are marked as the permitted band. Any pixel not belonging to the permitted band is categorized as the far-current-CU guard band.

In FIG. 11E, the permitted band is the permitted band of FIG. 11D added by a previous CTU. Any pixel not belonging to permitted band is categorized as the far-current-CU guard band. In FIG. 11F, the permitted band is the permitted band of FIG. 11D added by some pixel columns inside the previous CTU. Any pixel not belonging to permitted band is categorized as the far-current-CU guard band.

Another very important permitted band embodiment is the VVC style IBC mode permitted band. In VVC style IBC mode, the reference sample for the current picture has an important band constraint as shown in the previous description.

Note that the figures shown above are intended for illustrating examples of the far-current-CU guard band. This invention is not limited to the examples. The proposed "far-current-CU guard band" may be any pixel region that is far away from the current CU.

Method 2—Merge Mode Enhancement Related to Guard Band of IBC

In order to improve the coding gain of IBC under guard band restriction, some new methods of Merge mode enhancement related to guard band of IBC are proposed.

Note that, all the described sub-methods in the following parts can be turned ON/OFF according to the current CU size or the shared parent CU size. In other words, if the current CU size or the shared parent CU size is larger than one predefined threshold, one of the sub-methods can be turned off (i.e., disabled). In another embodiment, if the current CU size or the shared parent CU size is smaller than one predefined threshold, one of the sub-methods can be turned off (i.e., disabled).

Method 2.1—Merge Candidate Removal According to the Guard Band or Permitted Band In this proposed method, it removes any Merge candidate where the reference CU is not inside the permitted band. In other words, the reference CU is partially inside the guard band. For example, if the Merge list for the IBC has 3 candidates (e.g. candidate 0, candidate 1 and candidate 2) and MV of candidate 0 is not inside the permitted band, the candidate 0 is removed from the Merge list or be treated as unavailable. In another embodiment, the condition of "partially inside the guard band" is replaced by "partially outside the permitted band".

Moreover, this algorithm can be applied based on the shared parent CU boundary of the shared candidate list method. In other words, during candidate removal for the shared candidate list according to the permitted band in IBC, the judgement of "whether the reference CU is inside the permitted band" can be based on the dimension (e.g. width, height, position) of the shared parent CU boundary. In other words, the reference CU is based on the shared parent CU boundary shifted by the BV (block vector). The shared candidate list can be modified by the candidate removal.

Method 2.2—Adjusted Default (i.e., Generated) Candidate

For a conventional Merge mode, when the number of the candidates of the Merge list is lower than the maximum Merge list candidate number, some "generated candidates" of zero MV may be added to the Merge list. These generated candidates are named as "Default Candidate" or "Generated Candidate". When the Merge mode of IBC with guard band is being processed, the default candidate is implicitly changed to be inside the permitted band according to an embodiment of the present invention.

In the proposed method, for IBC with Guard band, if the default candidate is not inside the permitted band, the default candidate will be adjusted to be inside the permitted band. There are various embodiments as shown below.

Embodiment 2.2.1—Only horizontal part of the MV is adjusted, such as directly adding the MV_x by a value, so that the modified candidate can be inside the permitted band. For example, it can make the default MV=(−W, 0), where W is the current CU width.

Embodiment 2.2.2—only vertical part of the MV is adjusted, such as directly adding the MV_y by a value, so that the modified candidate can be inside the permitted band. For example, it can make the default MV=(0, −H), where H is the current CU height.

Embodiment 2.2.3—This embodiment is a multiple-default-candidates method. In this method, it inserts multiple default candidates into Merge list, each default candidate has its own generating rule so that the modified candidate can be inside the permitted band. In one example, (MV_x+constant) is an adjusted default candidate. In another example, MV_y+constant) is an adjusted default candidate. In yet another example, (MV_x+constant1, MV_y+constant2) is an adjusted default candidate.

Embodiment 2.2.4—In this embodiment, it directly scales one of Merge candidates to be inside the permitted band. The MV scaling is to multiply (MVx, MVy) by a pre-defined constant for one (e.g. candidate 0) of Merge candidates. The scaled candidate is then inserted into Merge list.

The adjustment method of the default candidates is not limited to the exemplary embodiments shown above. Any method to adjust the default candidates due to the guard band of IBC can be used.

Method 2.3—Candidate Reorder According to the Permitted Band

In this proposed method, it reorders the order of Merge candidates in the candidate list according to the permitted band. In other words, it reorders the Merge candidates according to whether the candidate is fully in the permitted band. If the candidate is out of the permitted band, it is preferred to reorder this candidate toward a rear position in candidate list. If the candidate is inside the permitted band, it is preferred to reorder this candidate toward a front position in candidate list. For 2 candidates that are both outside the permitted band, it is preferred to reorder the "closer to the permitted band" candidate to be before the "far away from permitted band" candidate in the candidate list.

Moreover, this algorithm can be applied based on the shared parent CU boundary of the shared candidate list method. In other words, during candidate reorder for the shared candidate list according to the permitted band in IBC, the judgement of "whether the reference CU is inside the permitted band" can be based on the dimension (e.g. width, height, position) of the shared parent CU boundary. In other words, the reference CU is based on the shared parent CU boundary shifted by the BV (block vector). The shared candidate list can be modified by the candidate reorder.

In another embodiment, the candidate reorder can be according to L-shape template matching cost. The L-shape template includes the current L-shape template and the reference L-shape template. The current L-shape template includes the top-neighbouring pixels of current CU and/or left-neighbouring pixels of current CU. The reference L-shape template includes the top-neighbouring pixels of reference CU and/or left-neighbouring pixels of reference CU. The SAD (sum of absolute difference) matching or SSD (sum of square difference) matching algorithm can be calculated between the current L-shape template and the reference L-shape template. The candidates can be reordered according to the matching costs of all the candidates. To simplify the L-shape template matching complexity, the L-shape template can be simplified to include only top neighbouring pixels above the current block, or only left neighbouring pixels to the left of the current block. In another embodiment, the L-shape template can be simplified to include only partial pixels of top neighbouring pixels. In another embodiment, the L-shape template can be simplified to include only partial pixels of left neighbouring pixels.

Method 3—AMVP Enhancement Related to Guard Band or Permitted Band of IBC

In order to improve the coding gain of IBC under guard band restriction, some new methods of AMVP mode enhancement related to guard band of IBC are proposed.

Note that, all the described sub-methods in the following parts can be turned ON/OFF according to the current CU size or the shared parent CU size. In other words, if the current CU size or the shared parent CU size is larger than one predefined threshold, one of the sub-methods can be turned off (i.e., disabled). In another embodiment, if the current CU size or the shared parent CU size is smaller than one predefined threshold, one of the sub-methods can be turned off (i.e., disabled).

Method 3.1—Adjusted Default Candidate

Conventionally, when the number of the candidates of the AMVP list is lower than the maximum number of candidates in AMVP list, some "generated candidates" of zero MV may be added to the AMVP list. In IBC with guard band, if the default (i.e., generated) AMVP candidate is not inside the permitted band, the default candidate will be adjusted to be inside the permitted band or near the boundary between the permitted band and guard band. There are various embodiments as shown below.

Embodiment 3.1.1—Only horizontal part of the MV is adjusted, such as directly adding the MV_x by a value, so that the modified candidate can be inside the permitted band or near the boundary between the permitted band and guard band. The boundary between the permitted band and guard band is also referred as the boundary of the permitted band.

Embodiment 3.1.2—Only vertical part of the MV is adjusted, such as directly adding the MV_y by a value, so that the modified candidate can be inside the permitted band or near the boundary between the permitted band and guard band.

Embodiment 3.1.3—This embodiment is a multiple-default-candidates method. It inserts multiple default candidates into AMVP list, where each default candidate has its own generating rule. For example, the generated method of default candidate 0 may be (MV_x+constant), and the generated method of default candidate 1 may be (MV_y+constant), and the generated method of default candidate 2 may be (MV_x+constant1, MV_y+constant2).

Embodiment 3.1.4—It directly scales one of AMVP candidates to be inside the permitted band or near the boundary between the permitted band and guard band. In this embodiment, it directly scales one (e.g. candidate 0) of AMVP candidates to adjust it to be inside the permitted band or near the boundary between the permitted band and guard band. The scaled candidate is then inserted into AMVP list. The scaling can be done by multiplying (MVx, MVy) by a pre-defined constant.

The adjustment method of the default candidates is not limited to the exemplary embodiments shown above. Any method to adjust the default candidates due to the guard band of IBC can be used.

Method 3.2—Candidate Removal According to the Guard Band or Permitted Band

In this proposed method, it removes any AMVP candidate, where the reference CU is not inside the permitted band or inside the guard band with a large distance between the reference CU and the "boundary between permitted band and guard band". For example, if the AMVP list for IBC has 3 candidates (e.g. candidate 0, candidate 1 and candidate 2), MV of candidate 0 is not inside the permitted band or inside the guard band with large distance between the reference CU and the "boundary between permitted band and guard band", the candidate 0 is removed from the AMVP list or treated as unavailable.

Moreover, this algorithm can be applied based on the shared parent CU boundary of the shared candidate list method. In other words, during candidate reorder for the shared candidate list according to the permitted band in IBC, the judgement of "whether the reference CU is inside the permitted band" can be based on the dimension (e.g. width, height, position) of the shared parent CU boundary. In other words, the reference CU is based on the shared parent CU boundary shifted by the BV (block vector). The shared candidate list can be modified by the candidate reorder.

Method 3.3—Candidate Reorder According to the Guard Band or Permitted Band

In this proposed method, it reorders the order of AMVP candidates in the candidate list according to the guard band. In other words, it reorders the AMVP candidates according to whether the candidate is in the guard band or in the permitted band, or whether the candidate is close to the "boundary between permitted band and guard band". If the candidate is outside the permitted band, it is preferred to reorder/place this candidate toward a rear position in the candidate list (for example, put this candidate at a position after its predefined position in the candidate list). If the candidate is inside the permitted band, it is preferred to reorder/place this candidate toward a front position in candidate list (for example, put this candidate at a position before its predefined position in the candidate list). For 2 candidates that are both outside the permitted band, it is preferred to reorder the "closer to the permitted band" candidate to be before the "far away from permitted band" candidate in the candidate list.

In another embodiment, the candidate reorder can be according to the L-shape template matching cost. The L-shape template includes the current L-shape template and reference L-shape template. The current L-shape template includes the top-neighbouring pixels of current CU and/or left-neighbouring pixels of current CU. The reference L-shape template includes the top-neighbouring pixels of reference CU and/or left-neighbouring pixels of reference CU. The SAD (sum of absolute difference) matching or SSD (sum of square difference) matching algorithm can be calculated between the current L-shape template and reference L-shape template. The candidates can be reordered according to the matching costs of all the candidates. To simplify the L-shape template matching complexity, the L-shape template can be simplified to include only top neighbouring pixels, or only left neighbouring pixels, in another embodiment, the L-shape template can be simplified to include only partial pixels of only top neighbouring pixels. In another embodiment, the L-shape template can be simplified to include only partial pixels of only left neighbouring pixels.

Method 3.4—MVD Subtraction by the Guard Band or Permitted Band

In IBC with guard band, a method named "MVD subtraction by the guard band" is proposed. In the AMVP mode, the reference CU of the current MV predictor (i.e., an AMVP candidate in the AMVP candidate list) may be inside the guard band. In this case, it can subtract the MVD by a value (e.g. subtracting the horizontal part of the MVD, or vertical part of the MVD, or both). This subtraction value is related to the distance from the current CU to the guard band boundary (i.e., boundary between guard band and permitted band). Some examples of "MVD subtraction by the guard band" are shown in FIG. 12A and FIG. 12B.

Figure 12A:
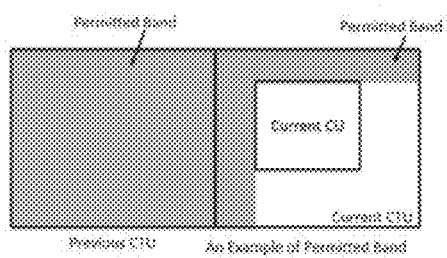
FIG. 12A illustrates an example of "MVD subtraction by the guard band" according to an embodiment of the present invention, where the position of reference CU is on the left side of the guard band and the MVD subtraction is a horizontal part subtraction.
Figure 12A:
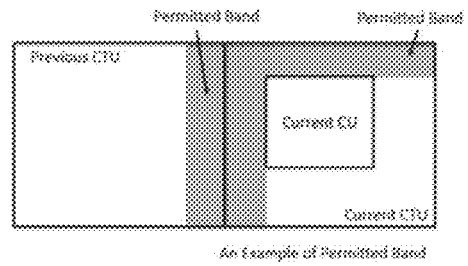
Figure 12A:
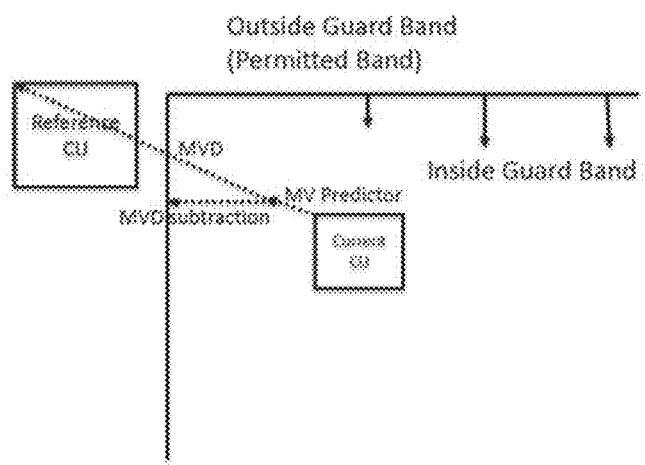

In FIG. 12A, the position of reference CU is on the left side away from the guard band. The reference CU may be larger than the current CU due to the need of extra pixels for fractional pixel Interpolation. The MVD subtraction (as shown in FIG. 12A) is a horizontal part subtraction, i.e., sent-*MVD*=(*mvd_x*–"*MVD* subtraction value", *mvd_y*).

The MVD subtraction design can cause the sent bit-rate of MVD (i.e., sent-MVD) shorter, so as to improve the coding gain. Decoder can add the "MVD subtraction value" from the received MVD to reconstruct the original MVD.

Figure 12B:
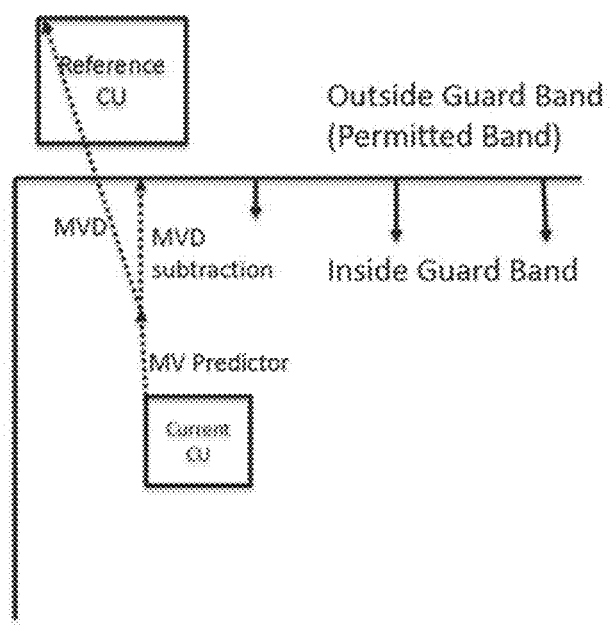
FIG. 12B illustrates an example of "MVD subtraction by the guard band" according to an embodiment of the present invention, where the position of reference CU is on the top side of the guard band and the MVD subtraction is a horizontal part subtraction.

In FIG. 12B, the position of reference CU Inter is on the top side away from guard band.

The MVD subtraction (as shown in FIG. 12B) is a vertical part subtraction, i.e., sent-*MVD*=(*mvd_x*,*mvd_y*–"*MVD* subtraction value").

The MVD subtraction design can cause the sent bit-rate of MVD (i.e., sent-MVD) shorter, so as to improve the coding gain. Decoder can add the "MVD subtraction value" from the received MVD to reconstruct the original MVD.

The MVD subtraction mode (i.e., subtracting the horizontal part or vertical part or both) can be signalled in the picture header, or slice header, or CTU level, or CU level. In another embodiment, it can also be pre-defined as all-horizontal-part-subtraction in a video coding system. In another embodiment, it can also be pre-defined as all-vertical-part-subtraction in a video coding system.

Method 3.5—MVD Sign Prediction by the Guard Band or Permitted Band

In IBC with guard band or permitted band, a method named "MVD sign prediction by the guard band" is proposed. In the proposed method, the sent_sign_bits of MVD can be saved or reduced by using the information of the guard band. In other words, the decoder may receive the MVD without sign information, with only partial sign information, or with transformed sign information (e.g. transformed into other information, and decoded as correct sign according to some guard band information). According to the guard band position and distance related to the current CU and MV predictor magnitude, the correct sign can be implicitly judged in the decoder. In another embodiment, the correct sign can be derived according to the guard band position and distance related to the current CU and MV predictor magnitude and the partial sign information sent from encoder. In another embodiment, the correct sign can be derived according to the guard band position and distance related to the current CU and MV predictor magnitude and the transformed sign information sent from encoder. In the above, methods of reducing bit rate for MVD signalling are disclosed by signalling information of the MVD without sign information or with reduced sign information by utilizing other information related to MVD. For example, the other information of MVD includes the guard band position and distance related to the current CU and MV predictor magnitude the guard band position and distance related to the current CU and MV predictor magnitude.

Figure 12C:
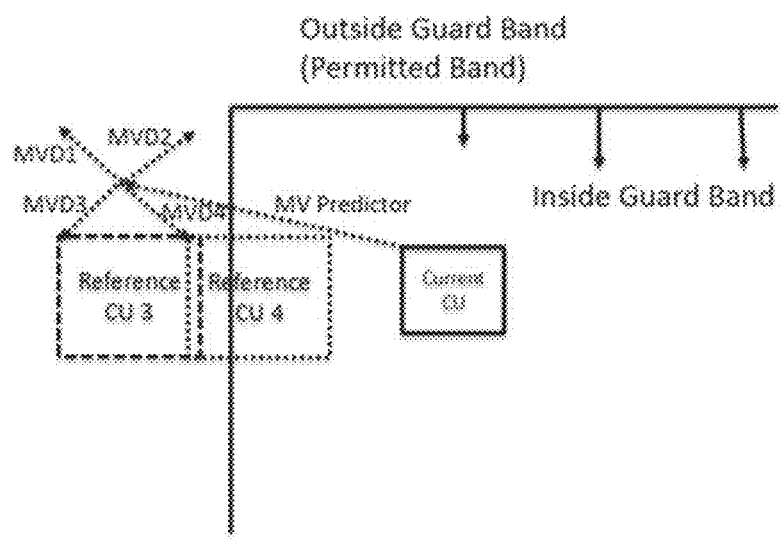
FIG. 12C illustrates an example of decoding the MVD without sign information or with reduced sign information of the MVD according to an embodiment of the present invention.

One example is shown in FIG. 12C. In this case, the encoder only sends the MVD sign of vertical direction, but no MVD sign of horizontal direction, to the decoder. In the FIG. 12C, MVD1, MVD2, MVD3 and MVD4 all have the same MVD_x magnitude and MVD_vmagnitude, but with all different sign of x and sign of y. Decoder can easily derive the MVD sign of horizontal direction.

In FIG. 12C, since MVD2 and MVD4 violate the guard band restriction, the MVD2 and MVD4 are not correct. Therefore, the decoder can easily judge the sign of horizontal to be negative (i.e., MVD motion vector horizontal part being negative).

In one example, the 2-bit sign bits (of horizontal direction and vertical direction) are transformed into a new code. The MVD has magnitude part MVD_mag_x ($>=0$), and MVD_mag_y ($>=0$) and sign part MVD_sign_x (0 or 1), and MVD_sign_y (0 or 1), where sign bit 1 means negative MVD and sign bit 0 means positive MVD. In the decoder side, all possible sign combinations of current MVD are listed as a sign candidate list first. It can assume 4 possible combinations of sign, i.e., (MVD_sign_x, MVD_sign_y)= (0, 0), (0, 1), (1, 0), or (1,1). The received MVD_mag_x and MVD_mag_y can be used to generate 4 possible MVDs. In the sign candidate list, the "assumed" 4 MVDs (MVD with sign (0, 0), (0, 1), (1, 0), or (1, 1)) are checked with "whether the reference CU is inside the permit band". If the reference CU generated by "assumed MVD" is not inside the permit band, it is reordered toward a rear position of sign candidate. Therefore, it is possible that the front candidates in the sign candidate list will generate the MV to let the reference CU be inside the permit band, and the later candidates in the sign candidate list will generate the MV to let the reference CU be outside the permit band. Finally, the encoder will use the a new code. For example, it can be a truncated-unary code as 0: index=0, 10: index=1, 110: index=2, and 111: index=3. In another example, it can be a fixed-2-bit code as 00: index=0, 01: index=1, 10: index=2, and 11: index=3.

In the case of using transformed sign information, there may be an issue for the decoder to correctly parse the sign information sent from encoder. The 2 bits for MVD sign bits associated with one MVD are transformed sign information now. When decoder receives the 2 bits sign information, it can build 4 sign candidates (e.g. MVD1, MVD2, MVD3 and MVD4 as shown in FIG. 12C), and then remove some candidates (e.g. one violating the guard band) that is not fully inside the permitted band. Then, among the remaining candidates, the final candidate can be determined by the 2-bits sign information.

There are several sign transformation methods. In this method, some candidates among the 4 sign candidates (e.g. MVD1, MVD2, MVD3 and MVD4 as shown in FIG. 12C) are removed by the guard band. Then, the remaining candidates are assigned an increasing index starting from 0. Then, the index is signalled (2 bits) from encoder to decoder.

In another embodiment, the transformation is only executed in the horizontal direction or vertical direction. For example, if the magnitude of horizontal direction is 0, no sign information needs to be sent. Therefore, in this case, only vertical direction sign information needs to send for MVD. Therefore, decoder only needs to assume 2 possible sign combinations, and the current sign candidate list has only 2 candidate (e.g. vertical sign=1 or sign=0).

For example, if the magnitude of vertical direction is 0, no sign information needs to be sent. Therefore, in this case, only horizontal direction sign information needs to be sent for MVD. Therefore, decoder only need to assume 2 possible sign combinations, and the current sign candidate list has only 2 candidate (i.e., horizontal sign=1 or sign=0).

In another embodiment, the number of candidates in the sign candidate list can be different depending whether the MVD magnitude is zero for the horizontal part or vertical part. For example, in the case that the MVD magnitude is nonzero for both the horizontal part and the vertical part, the number of candidates in the sign candidate list is 4 and a total of 4 "assumed MVDs" can be checked for the "whether inside permitted band" and the sign candidates can be reordered. For example, in the case that MVD magnitude is zero only for horizontal part or only for vertical part, the number of candidates in the sign candidate list is 2 and a total of 2 "assumed MVDs" can be checked for the "whether inside permitted band" and the sign candidates can be reordered.

In another embodiment, the MVD sign reorder can be reordered according to L-shape template matching cost. The L-shape template includes the current L-shape template and reference L-shape template. The current L-shape template includes the top-neighbouring pixels of current CU and/or left-neighbouring pixels of current CU. The reference L-shape template includes the top-neighbouring pixels of reference CU and/or left-neighbouring pixels of reference CU. The SAD matching or SSD matching algorithm can be calculated between the current L-shape template and the reference L-shape template. The MVD sign candidates can be reordered according to the matching costs of all the sign candidates. To simplify the L-shape template matching complexity, the L-shape template can be simplified to include only the top neighbouring pixels or only the left neighbouring pixels. In another embodiment, the L-shape template can be simplified to include only partial pixels of only top neighbouring pixels. In yet another embodiment, the L-shape template can be simplified to include only partial pixels of only left neighbouring pixels.

In another embodiment, the MVD sign reorder process can be extended to reorder "MVD sign combined with AMVR mode". In VVC, IBC MVD can be 1-pel unit or 4-pel unit according to IBC's AMVR signal. Therefore, the MVD sign bits (at most 2 bit) and AMVR signal (for example, 1 bit) in IBC can be grouped into an "MVD_sign+AMVR mode" candidate list. Each candidate means a possible combination of MVD_horizontal_sign, MVD vertical_sign and AMVR mode. For example, there may be a total of 8 candidates, i.e., (000, 001, 010, 011, 100, 101, 110, 111) inside the "MVD_sign+AMVR mode" candidate list. Then, the BV of 8 candidates can be checked for L-shape template and/or checked for "whether inside the permitted band". The candidTES can be reordered according to the L-shape template matching and/or checked for "whether inside the permitted band". Decoder can reorder the "MVD_sign+AMVR mode" candidate list and then the decoder will choose one candidate by using the index sent from the encoder to decoder to select the candidate inside the reordered candidate list.

Method 4—IBC Mode Coding Enhancement Related to Permitted Band

In this method, for some CUs in a leftmost CTU inside a picture, there is no valid block-vector for the reference CU of IBC. For example, for the left-top-most CU inside the leftmost CTU inside a picture, if the permitted band is the "decoded area inside current CTU and a number of 64×64 blocks of left CTU", there is no way for this CU to have a valid block vector. In this case, the IBC mode coding of the current CU can be inferred to be false. In other words, this CU is forced to turn off the IBC mode flag and related syntax can be saved.

In another embodiment, a region inside the leftmost CTU inside the picture can be defined in this range, the IBC mode will be inferred as 0. In other words, IBC is implicitly turned off inside the pre-defined region. For example, it can define the region as a region consisting of any CU which is in the left part inside the left-most CTU and IBC is implicitly turned off inside the pre-defined region.

Method 5—IBC Predictor Forcing

In this method, if the current MV (also named as block vector (BV) in IBC) points to one reference CU that is not inside the permitted band, it will be treated as "invalid situation" in a conventional approach and error concealment handling of decoder may be activated. However, the proposed method can treat it as "valid situation" and fill the IBC predictor with a "default pixel value", such as 128. This IBC predictor forcing method can be applied to IBC Merge candidate, IBC AMVP candidate, IBC chroma predictor in dual tree (chroma separate tree in Intra case in VVC), and other IBC motion compensation function block.

Method 6—IBC BV Forcing

In this method, if the current MV points to one reference CU that is not inside the permitted band, it will be treated as "invalid situation" in a conventional approach and error concealment handling of decoder may be activated. However, the proposed method can treat it as "valid situation" and fill the current MV (or BV) by the "default BV" value. For example, it can fill the current MV (or BV) by (−W, −H). In other words, the BV points to W pixels to the left and H pixels to the top. In another embodiment, it can fill the current MV (or BV) by (−W, 0). In another embodiment, it can fill the current MV (or BV) by (0, −H). In another embodiment, it can fill the current MV (or BV) by other default MV (or BV value).

Method 7—Candidate Removal with Default Predictor Candidate

In this embodiment, for IBC Merge mode and/or IBC AMVP mode, Method 2.1, "Merge mode Candidate Removal according to the Permit Band" and/or Method 3.2, "AMVP mode Candidate Removal according to the Permit Band" disclosed above can be applied. After all the candidates except for the default candidate in Merge mode and AMVP mode, are checked for "whether to remove by permitted band", the "predictor forcing" default candidates can be appended toward the rear part in the candidate list. The "predictor forcing" default candidate is defined as a special candidate with NULL (i.e., empty, or zero) BV value. When using this candidate for motion compensation, the motion compensation will not generate any pixel. Instead, it only fills the predictor pixels by a "predefined default value".

Method 8—Candidate Refinement by the L-Shape Template

In this embodiment, the BV of the current candidate can be refined (e.g. changing the BV value) according to the L-shape template matching cost. The L-shape template includes the current L-shape template and reference L-shape template. The current L-shape template includes the top-neighbouring pixels of current CU and/or left-neighbouring pixels of current CU. The reference L-shape template includes the top-neighbouring pixels of reference CU and/or left-neighbouring pixels of reference CU. The SAD matching or SSD matching algorithm can be calculated between the current L-shape template and reference L-shape template. The MVD sign candidates can be reordered according to the matching costs of all the sign candidates. To simplify the L-shape template matching complexity, the L-shape template can be simplified to include only the top neighbouring pixels or only the left neighbouring pixels. In another embodiment, the L-shape template can be simplified to include only partial pixels of only top neighbouring pixels. In another embodiment, the L-shape template can be simplified to include only partial pixels of only left neighbouring pixels. The BV of the current candidate can be refined (e.g. changing the BV value) according to the L-shape template matching. Therefore, the BV can be refined by modifying the horizontal BV part and/or the vertical BV part to cause the matching cost as low as possible.

The foregoing proposed methods can be implemented in encoders and/or decoders. For example, any of the proposed methods can be implemented in an entropy encoding module or a block partition module in an encoder, and/or an entropy parser module or a block partition module in a decoder. Alternatively, any of the proposed methods can be implemented as a circuit coupled to the entropy encoding module or the block partition module in the encoder, and/or the entropy parser module or the block partition module in the decoder, so as to provide the information needed by the entropy parser module or the block partition module.

Figure 13:
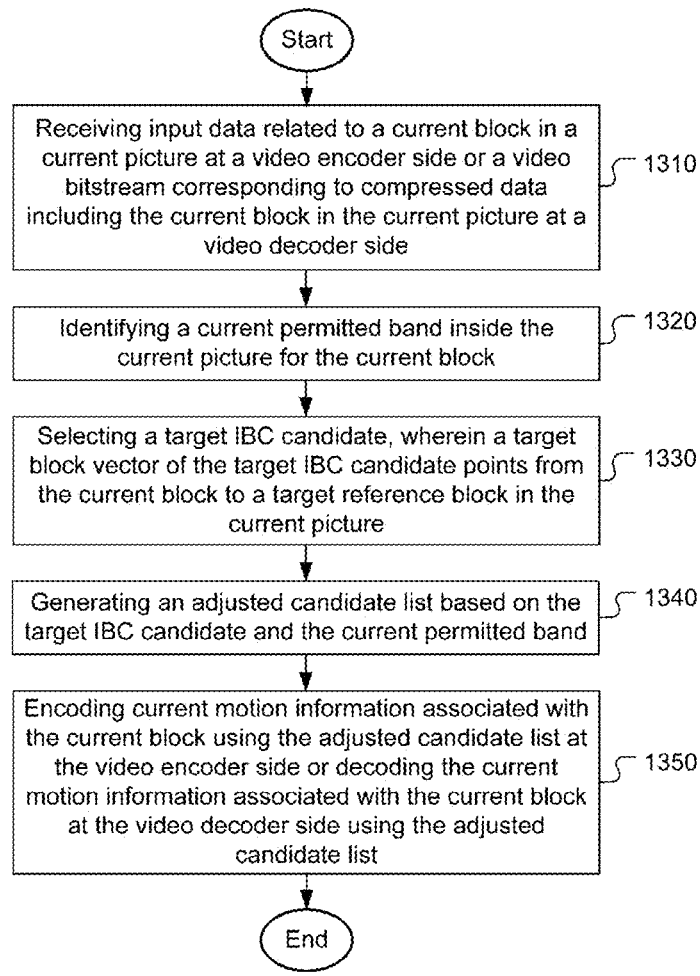
FIG. 13 illustrates a flowchart of an exemplary coding system with the IBC (Intra Block Copy) coding tool according to an embodiment of the present invention.

FIG. 13 illustrates a flowchart of an exemplary coding system with the IBC (Intra Block Copy) coding tool according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side are received in step 1310. A current permitted band inside the current picture for the current block is identified in step 1320. A target IBC candidate is selected in step 1330, wherein a target block vector of the target IBC candidate points from the current block to a target reference block in the current picture. An adjusted candidate list is generated by taking into account of the target IBC candidate and the current permitted band in step 1340. The current motion information associated with the current block is encoded using the adjusted candidate list at the video encoder side or the current motion information associated with the current block is decoded at the video decoder side using the adjusted candidate list in step 1350.

Figure 14:
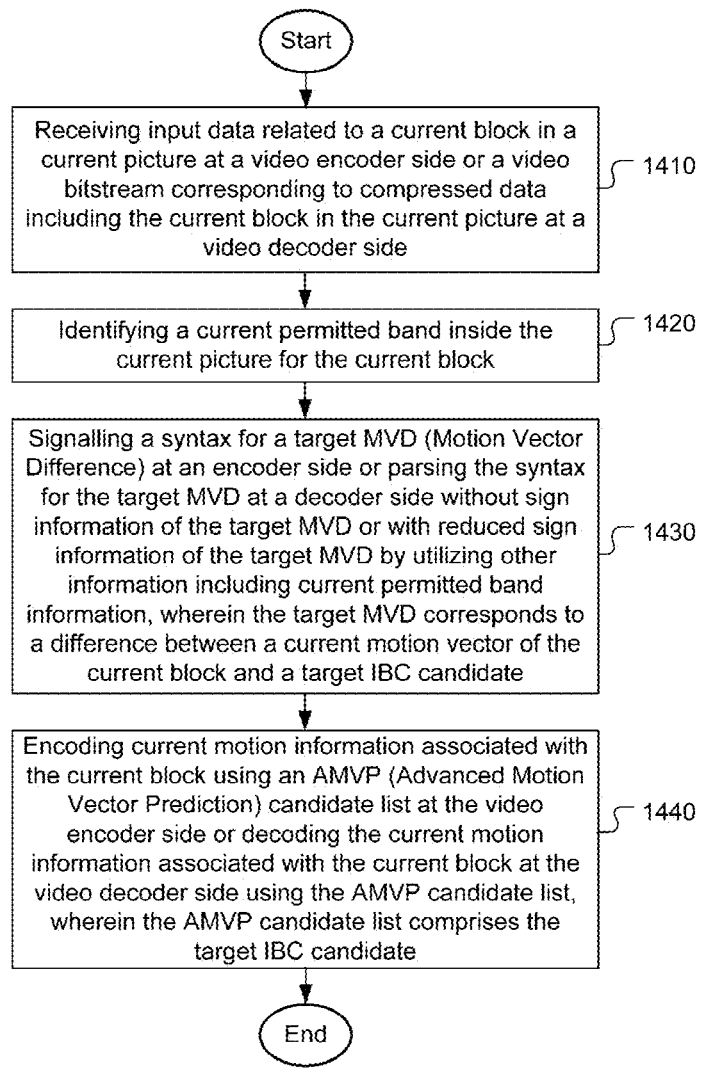
FIG. 14 illustrates a flowchart of another exemplary coding system with the IBC (Intra Block Copy) coding tool according to an embodiment of the present invention.

FIG. 14 illustrates a flowchart of another exemplary coding system with the IBC (Intra Block Copy) coding tool according to an embodiment of the present invention. According to this method, input data related to a current block in a current picture are received at a video encoder side or a video bitstream corresponding to compressed data including the current block in the current picture are received at a video decoder side are received in step 1410. A current permitted band inside the current picture for the current block is step 1420. A syntax for a target MVD (Motion Vector Difference) is signalled at an encoder side or parsed at a decoder side without sign information of the target MVD or with reduced sign information of the target MVD by utilizing other information including current permitted band information in step 1430, where the target MVD corresponds to a difference between a current motion vector of the current block and a target IBC candidate. Current motion information associated with the current block is encoded using an AMVP (Advanced Motion Vector Prediction) candidate list at the video encoder side or decoded at the video decoder side using the AMVP candidate list in step 1440, wherein the AMVP candidate list comprises the target IBC candidate.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding including IBC (Intra Block Copy) coding tool, the method comprising:
   receiving input data related to a current block in a current picture at a video encoder side or a video bitstream corresponding to compressed data including the current block in the current picture at a video decoder side;
   identifying a current permitted band inside the current picture for the current block;
   selecting a target IBC candidate, wherein a target block vector of the target IBC candidate points from the current block to a target reference block in the current picture;
   generating an adjusted candidate list by taking into account of the target IBC candidate and the current permitted band; and
   encoding current motion information associated with the current block using the adjusted candidate list at the video encoder side or decoding the current motion information associated with the current block at the video decoder side using the adjusted candidate list.

2. The method of claim 1, wherein the target IBC candidate is removed from the adjusted candidate list if the target reference block is not fully inside the current permitted band.

3. The method of claim 1, wherein the target IBC candidate corresponds to a default candidate, and wherein if the target reference block is not fully inside the current permitted band, the target IBC candidate is adjusted to cause the target reference block to be fully inside the current permitted band.

4. The method of claim 3, wherein the target IBC candidate is adjusted by adding a first offset to an x-component of the target IBC candidate, adding a second offset to a y-component of the target IBC candidate, or adding the first offset and the second offset to the x-component of the target IBC candidate and the y-component of the target IBC candidate respectively.

5. The method of claim 1, wherein position ordering of the target IBC candidate within the adjusted candidate list is determined based on the target IBC candidate and the current permitted band.

6. The method of claim 5, wherein the position ordering of the target IBC candidate within the adjusted candidate list is determined depending on whether the target reference block is fully inside the current permitted band.

7. The method of claim 5, wherein the target IBC candidate is placed in the adjusted candidate list such that a target position of the target IBC candidate in the adjusted candidate list toward a rear part of the adjusted candidate list if the target reference block is outside the current permitted band.

8. The method of claim 5, wherein the target IBC candidate is placed in the adjusted candidate list such that a target position of the target IBC candidate in the adjusted candidate list toward a front part of the adjusted candidate list if the target reference block is inside the current permitted band.

9. The method of claim 1, wherein position ordering of the target IBC candidate within the adjusted candidate list is further determined based on L-shape template matching cost.

10. The method of claim 1, wherein the adjusted candidate list corresponds to a Merge candidate list or an AMVP (Advanced Motion Vector Prediction) candidate list.

11. An apparatus of Inter prediction for video coding including IBC (Intra Block Copy) coding tool, the apparatus comprising one or more electronic circuits or processors arranged to:

receive input data related to a current block in a current picture at a video encoder side or a video bitstream corresponding to compressed data including the current block in the current picture at a video decoder side;

identify a current permitted band inside the current picture for the current block;

select a target IBC candidate, wherein a target block vector of the target IBC candidate points from the current block to a target reference block in the current picture;

generate an adjusted candidate list by taking into account of the target IBC candidate and the current permitted band; and encode current motion information associated with the current block using the adjusted candidate list at the video encoder side or decode the current motion information associated with the current block at the video decoder side using the adjusted candidate list.

* * * * *